(12) United States Patent
Fukui

(10) Patent No.: US 11,442,048 B2
(45) Date of Patent: Sep. 13, 2022

(54) ESI SPRAYER TUBE AND ESI SPRAYER

(71) Applicant: SHIMADZU CORPORATION, Kyoto (JP)

(72) Inventor: Wataru Fukui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/754,154

(22) PCT Filed: Oct. 27, 2017

(86) PCT No.: PCT/JP2017/038881
§ 371 (c)(1),
(2) Date: Apr. 7, 2020

(87) PCT Pub. No.: WO2019/082374
PCT Pub. Date: May 2, 2019

(65) Prior Publication Data
US 2021/0208113 A1      Jul. 8, 2021

(51) Int. Cl.
*H01J 49/16* (2006.01)
*G01N 30/02* (2006.01)
*G01N 30/72* (2006.01)

(52) U.S. Cl.
CPC ........ *G01N 30/7266* (2013.01); *H01J 49/167* (2013.01); *G01N 2030/027* (2013.01)

(58) Field of Classification Search
CPC ............... G01N 30/60; G01N 30/6004; G01N 30/6026; G01N 30/603; G01N 30/7266; G01N 30/724; G01N 2030/027; H01J 49/165; H01J 49/167; B01D 15/10; B01D 15/22
See application file for complete search history.

(56) References Cited

U.S. PATENT DOCUMENTS

| 4,885,076 | A | * | 12/1989 | Smith | ................ | G01N 27/4473 |
| | | | | | | 204/451 |
| 5,306,412 | A | * | 4/1994 | Whitehouse | ........ | B05B 17/0623 |
| | | | | | | 204/452 |
| 5,965,883 | A | * | 10/1999 | Lee | ........................ | H01J 49/167 |
| | | | | | | 250/288 |
| 6,043,487 | A | | 3/2000 | Waki | | |

(Continued)

FOREIGN PATENT DOCUMENTS

EP     0860858 A1    8/1998
JP     10-241626 A   9/1998

(Continued)

OTHER PUBLICATIONS

Communication dated Nov. 4, 2020, issued by the Japanese Patent Office in application No. 2019-549801.

(Continued)

*Primary Examiner* — Ryan B Huang
*Assistant Examiner* — Jeannie McDermott
(74) *Attorney, Agent, or Firm* — Sughrue Mion, PLLC

(57) ABSTRACT

An ESI sprayer tube 10 includes: a first tube 11 having an inlet end; a second tube 12 having the inner diameter larger than the outer diameter of the first tube 11, the second tube 12 being located outside the first tube 11; and a tube fixation portion 14 formed to fill a space between the first tube 11 and the second tube 12, in a side close to the inlet end.

16 Claims, 4 Drawing Sheets

(56) References Cited

U.S. PATENT DOCUMENTS

| | | | | |
|---|---|---|---|---|
| 6,326,616 B1 * | 12/2001 | Andrien, Jr. | .......... | H01J 49/107 |
| | | | | 250/288 |
| 6,797,945 B2 * | 9/2004 | Berggren | ............ | H01J 49/0454 |
| | | | | 250/288 |
| 7,858,932 B2 * | 12/2010 | Finch | .................... | H01J 49/167 |
| | | | | 250/288 |
| 2015/0060566 A1 | 3/2015 | Nakano | | |

FOREIGN PATENT DOCUMENTS

| | | |
|---|---|---|
| JP | 2004-317469 A | 11/2004 |
| JP | 2015-49077 A | 3/2015 |

OTHER PUBLICATIONS

"Crevice corrosion prevention", Surface treatment measures Q & A1000: Industrial Technology Service Center Co., Ltd.
International Search Report for PCT/JP2017/038881 dated Jan. 23, 2018 [PCT/ISA/210].
Written Opinion for PCT/JP2017/038881 dated Jan. 23, 2018 [PCT/ISA/237].
Communication dated May 10, 2022 from the Chinese Patent Office in Chinese Application No. 201780095562.0.

\* cited by examiner

PRESENT EMBODIMENT

COMPARATIVE EMBODIMENT

ESI SPRAYER TUBE AND ESI SPRAYER

CROSS REFERENCE TO RELATED APPLICATIONS

This application is a National Stage of International Application No. PCT/JP2017/038881 filed Oct. 27, 2017.

TECHNICAL FIELD

The present invention relates to an electrospray ionization (ESI) sprayer for use in an ESI device in which a liquid sample is electrified and sprayed to be ionized. The ESI device is provided in an ion analysis device, such as a mass spectrometer.

BACKGROUND ART

A liquid chromatograph has been widely used as a device for analyzing components contained in a liquid sample. In the liquid chromatograph, a sample liquid is introduced in a column along the flow of a mobile phase, whereby various components contained in the sample liquid are separated in a time scale, and then the separated components are measured in a detector. The liquid chromatograph having a mass spectrometer as a detector is called a liquid chromatograph mass spectrometer. In the liquid chromatograph mass spectrometer, the sample liquid that flows out from the column of the liquid chromatograph along with the mobile phase is introduced in an ionization device in the mass spectrometer, whereby various components are ionized, and the generated ions are measured with respect to each of the mass-to-charge ratios.

An electrospray ionization (ESI) method is known as one of the ionization methods to be used in liquid chromatograph mass spectrometers. In the ESI method, various components in a sample liquid are ionized by electrifying the sample liquid and spraying the electrified sample liquid into an ionization chamber. In the ESI method, the sample liquid is introduced in an ESI sprayer so as to be ionized. The ESI sprayer includes a liquid-flowing tube through which a sample liquid flows, a gas-flowing tube provided outside the liquid-flowing tube for allowing a nebulizer gas to flow through, and a power supply section for applying a predetermined voltage (ESI voltage) to the liquid-flowing tube. Hereinafter, the liquid-flowing tube is referred to as an ESI sprayer tube. A sample liquid introduced in the ESI sprayer tube to which the ESI voltage is applied is electrified while flowing through the ESI sprayer tube. Then, the nebulizer gas is directed to the sample liquid at the distal end of the ESI sprayer tube, so that the sample liquid is sprayed into the ionization chamber for the ionization.

In the liquid chromatograph mass spectrometer, the ESI sprayer tube is connected to an outlet tube of the column. In order to prevent components separated in the column and concentrated in the mobile phase, from spreading while the components flows through the tube, a tube with a diameter as narrow as possible (a capillary with the inner diameter of about 10 μm, for example) is used for the ESI sprayer tube. Furthermore, ESI sprayer tubes made of stainless steel (SUS) are widely used, since stainless steel is inexpensive and highly durable.

A capillary made of the stainless steel is produced by drawing (elongating) a cylindrical body (pipe). However, it is difficult through the tube elongation method to produce a tube having a thick tube wall. Accordingly, a capillary having a small inner diameter inevitably has a small overall diameter. Such a capillary is bent or broken only by a small impact being applied to the capillary. In view of the above, a double tube structure is used for the ESI sprayer tube. In this structure, an inner tube (referred to as a first tube) and an outer tube (referred to as a second tube) that has the inner diameter larger than the outer diameter of the first tube and is shorter than the first tube are disposed so that the end faces of the respective first and second tubes are aligned at the same position to be flush at one of the ends of each tube (Patent Literature 1, for example). For example, as shown in FIG. 1, an ESI sprayer tube 100 is produced by applying an adhesive 130 to a second tube 120 at predetermined positions (two portions across the center of the tube, for example) respectively at one end side and the other end side in its inner face.

The ESI sprayer tube 100 is connected to an outlet tube 140 of a column by a tube-connecting tool 150 shown in FIG. 2. The tube-connecting tool 150 has a hollow cylindrical body, and has one end through which the outlet tube 140 of the column is inserted, and the other end through which the ESI sprayer tube 100 is inserted. Both tubes are in contact with each other at their end faces. Then, plastic deformation is performed to both ends of the tube-connecting tool 150 to fix the outlet tube 140 and the ESI sprayer tube 100.

CITATION LIST

Patent Literature

Patent Literature 1: JP 2004-317469 A

SUMMARY OF INVENTION

Technical Problem

The ESI sprayer tube having the aforementioned configuration was connected to the outlet tube of a column, and a sample liquid that flew out from the column was allowed to flow through the ESI sprayer tube for measurement. In this situation, clogging sometimes occurred inside the ESI sprayer tube.

An objective of the present invention is to prevent clogging from occurring in an ESI sprayer tube connected to an outlet tube of a column for allowing a sample liquid which flows out from the column to flow through.

Solution to Problem

The present invention developed for solving the previously described problem is an ESI sprayer tube including:
  a) a first tube having an inlet end;
  b) a second tube having the inner diameter larger than the outer diameter of the first tube, the second tube being located outside the first tube; and
  c) a tube fixation portion configured to fix the first tube and the second tube, the tube fixation portion being formed to fill a space between the first tube and the second tube, in a side close to the inlet end.

The ESI sprayer tube according to the present invention includes the first tube and the second tube having the inner diameter larger than the outer diameter of the first tube. These tubes are typically located so that the end faces of both tubes at the inlet end are at the same position to be flush. Both tubes are fixed to each other at the inlet end by the tube fixation portion that is formed to fill the space between the two tubes. The inlet end means one end of the ESI sprayer tube, through which a sample liquid is poured in the ESI sprayer from a liquid chromatograph, when the ESI sprayer tube is used for the ESI sprayer of a liquid chromatograph mass spectrometer.

In a conventional ESI sprayer tube, the first tube is fixedly attached to the second tube by applying adhesive only to a part of the inner wall of the second tube. Thus, when such an ESI sprayer tube was connected to the outlet tube of a column, and a sample liquid and a mobile phase (sample liquid and others) were introduced, the sample liquid and others entered a space between the two tubes from a part where no adhesive was applied. The sample liquid and others that enter the space between the two tubes is minimally exchanged with a sample liquid flowing through the outside of the space. This causes the oxygen concentration to gradually decrease. As a result, an oxygen concentration cell is formed to cause the tubes to corrode. Such a phenomenon of the occurrence of the corrosion due to a liquid that enters a space is called deposit corrosion. Further, it is conceivable that corrosion products generated due to the corrosion enter the first tube, thereby causing clogging. In particular, if a sample liquid that contains halide ions including chlorine ions flows into the space, the corrosion further develops to cause the clogging to easily occur in the first tube.

The ESI sprayer tube according to the present invention is used in a manner that the inlet-end portion where the tube fixation portion is formed is connected to the outlet tube of a column. In the ESI sprayer tube according to the present invention, the inlet-end portion of the space between the first tube and the second tube is completely closed over the outer periphery of the first tube. Accordingly, the sample liquid and others that flow out from the column never enter the space. Therefore, the deposit corrosion as mentioned earlier does not occur, so that the first tube 11 does not become clogged.

It is preferable in the ESI sprayer tube according to the present invention that at least the first tube is made of a conductive material, such as metal. With such a material, a sample liquid flowing in the first tube can be electrified by applying voltage to the first tube. Thus, it is not necessary to further provide a configuration for electrifying the sample liquid. It is also preferable that the second tube is made of a conductive material, and is connected to the first tube using a conductive material. With this configuration, the same voltage as that to be applied to the first tube is also applied to the second tube positioned outside the first tube, further ensuring the electrification of the sample liquid flowing through the first tube. In addition, it is only required for this configuration to apply the voltage to the second tube located in the outer side. Accordingly, flexibility in determining the location of a voltage application section and designing a voltage application path increases.

The tube fixation portion can be formed by various methods, such as soldering and laser welding. In particular, when the first tube and the second tube are made of the same material, it is preferable to form the tube fixation portion by laser welding. With this formation, the entire ESI sprayer tube is made of a single material. Accordingly, uniform potential is formed when the voltage is applied, so that the sample liquid can be stably electrified, and the appearance of another background noise caused by a material component of the tube fixation portion, which is mixed into the sample liquid, can be prevented. When the tube fixation portion is prepared by soldering, it is preferable that the tube fixation portion is made of a material (gold, silver, and so on) more inactive than the materials of the first tube and the second tube are (SUS or the like). Accordingly, even in the case where the tube fixation portion is formed by soldering a material different from those of the first tube and the second tube, the appearance of another background noise caused by a material component of the tube fixation portion, which is mixed into the sample liquid, can be prevented.

Advantageous Effects of Invention

Even when the ESI sprayer tube according to the present invention is connected to the outlet tube of a column, and a sample liquid that flows out from the column flows through the ESI sprayer tube, no clogging occurs.

DESCRIPTION OF EMBODIMENTS

An embodiment of the ESI sprayer tube according to the present invention is described as follows, with reference to the drawings. The ESI sprayer tube according to the present embodiment is used for allowing a sample liquid to flow through an ESI sprayer in an ionization section included in a mass spectrometer of a liquid chromatograph mass spectrometer.

Figure 1:
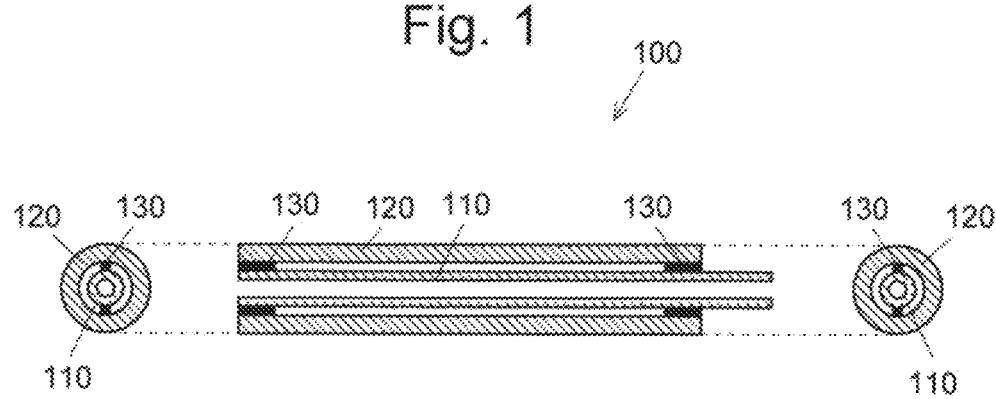
FIG. 1 is a diagram showing an example of an ESI sprayer tube that has been conventionally used.
Figure 2:
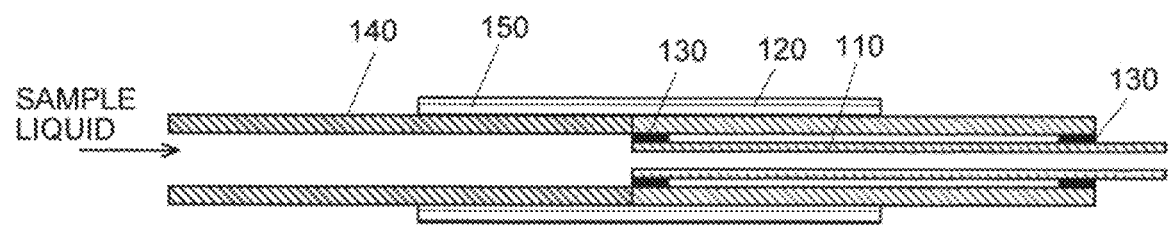
FIG. 2 is a diagram showing a connection between the ESI sprayer tube that has been conventionally used and an outlet tube of a column.
Figure 3:
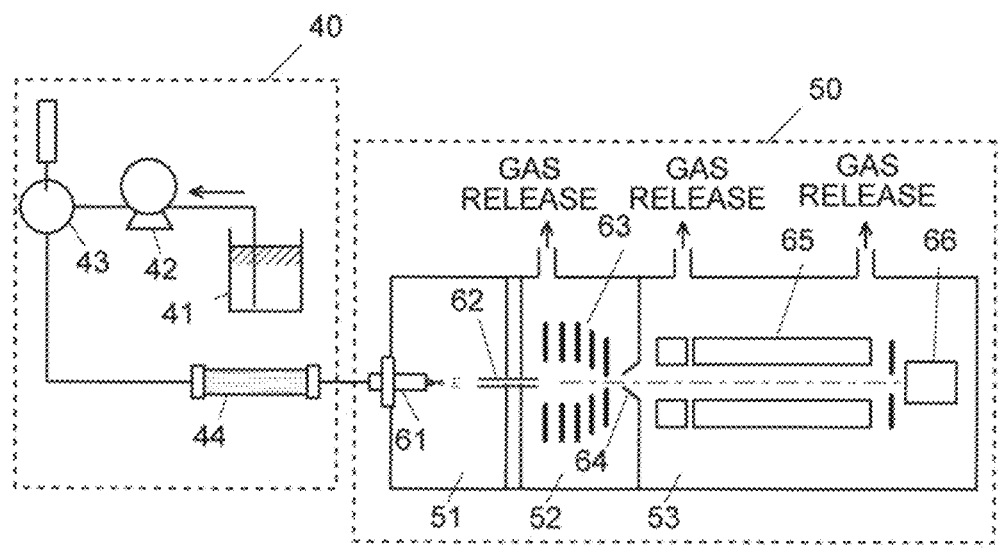
FIG. 3 is a schematic configuration diagram showing a liquid chromatograph mass spectrometer.

The schematic configuration of the entire liquid chromatograph mass spectrometer according to the present embodiment is described with reference to FIG. 3, before describing the configuration of the ESI sprayer tube according to the present embodiment.

The liquid chromatograph mass spectrometer includes two main units, i.e., a liquid chromatograph 40 and a mass spectrometer 50, and a controller (not shown) controls each section. The liquid chromatograph 40 includes: a mobile phase container 41 in which a mobile phase is stored; a pump 42 that absorbs the mobile phase and supplies it at a predetermined flow rate; an injector 43 that injects a liquid sample in a predetermined amount into the mobile phase; a column in which various components contained in the liquid sample are separated in a time direction; and a column oven (not shown) that holds a column 44 at a predetermined temperature. An autosampler (not shown) that puts a plurality of liquid samples into the injector 43 one by one is also provided.

The mass spectrometer 50 has the configuration of a differential pumping system which includes: an ionization chamber 51 maintained at approximately atmospheric pressure; an intermediate vacuum chamber 52 evacuated to a vacuum state by a vacuum pump (not shown); and an analysis chamber 53 evacuated to a high degree of vacuum. In the ionization chamber 51, an ESI sprayer 61 that electrifies a sample liquid flowing in the ionization chamber 51 and sprays the electrified sample liquid is provided. The ionization chamber 51 communicates with the intermediate vacuum chamber 52 in the next stage via a thin heated capillary 62. The intermediate vacuum chamber 52 is provided with an ion guide 63 for transporting ions to the next stage while converging the ions. The intermediate vacuum camber 52 is separated from the analysis chamber 53 by a skimmer 64 having a small hole at its apex. In the analysis chamber 53, a quadrupole mass filter 65 and an ion detector 66 are located. Although the quadrupole mass spectrometer is used in the present embodiment, other mass spectrometers (triple-quadrupole mass spectrometer and ion trap time-of-flight mass spectrometer) may be used.

In the mass spectrometer 50, selected ion monitoring (SIM) measurement and mass spectrometer (MS) scanning measurement can be performed. In the SIM measurement, ions are detected by fixing a mass-to-charge ratio of the ions that pass through the quadrupole mass filter 65. In the MS scanning measurement, ions are detected by scanning a mass-to-charge ratio of the ions that pass through the quadrupole mass filter 65.

Figure 4:
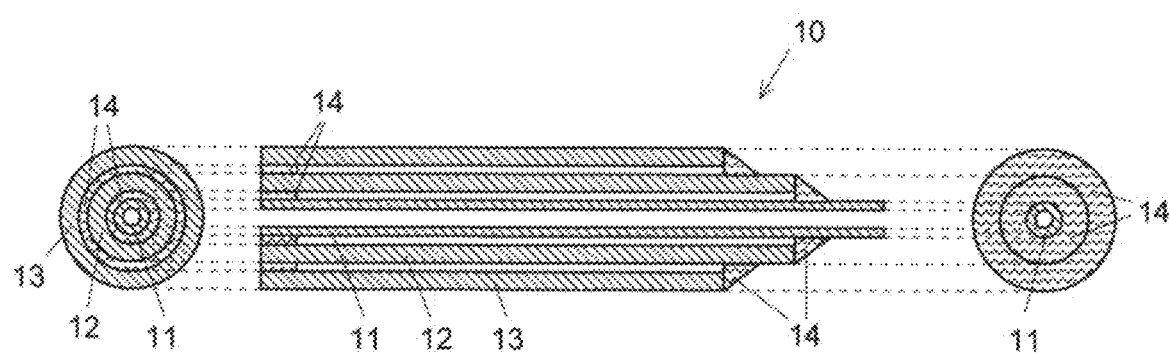
FIG. 4 is a diagram showing a configuration of an ESI sprayer tube according to the present embodiment.
Figure 5:
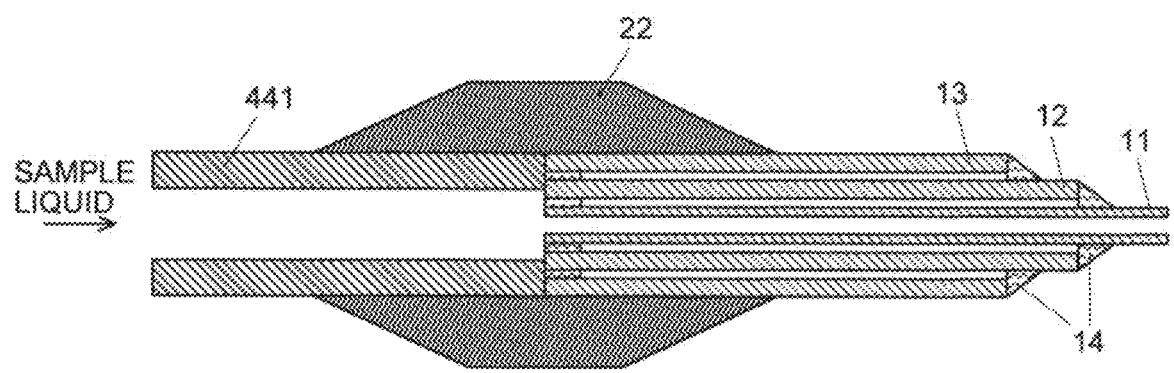
FIG. 5 is a diagram showing a connection between the ESI sprayer tube according to the present embodiment and the outlet tube of a column.

FIG. 4 shows a configuration of an ESI sprayer tube 10 according to the present embodiment. The center drawing is a cross sectional view of the ESI sprayer tube 10, the drawing on the left shows the ESI sprayer tube 10 seen from the upstream side (column 44 side), and the drawing on the right shows the ESI sprayer tube 10 as seen from the downstream side (ionization chamber 51 side). In FIG. 4 and FIG. 5 (to be described later), the length and thickness of each part of the ESI sprayer 10 are changed from the real measurements for intelligibly showing the configuration.

The ESI sprayer tube 10 is used for allowing a sample liquid to flow through an ESI sprayer 61. The ESI sprayer tube 10 has a first tube (inner tube) 11, a second tube (intermediate tube) 12 that is positioned around the outer periphery of the first tube 11 and is shorter than the first tube 11, and a third tube (outer tube) 13 that is positioned around the outer periphery of the second tube 12 and is shorter than the second tube 12. The first tube 11, the second tube 12, and the third tube 13 are a capillary that is made of stainless steel (SUS) and is produced by an elongation method in which pipes are extended.

The tubes are located so that ends of the respective tubes are at the same position to be flush in the upstream side. Each tube is welded at both end portions in the upstream side and the downstream side to be fixedly attached to another tube via a welded portion 14. In the upstream side, the end portions of the tubes are welded around their circumferences in a manner of filling a space between the first tube 11 and the second tube 12 and a space between the second tube 12 and the third tube 13. It should be noted that an end face of the tube is coarse due to welding. Accordingly, when the end face of the ESI sprayer tube 10 is in contact with an end face of the outlet tube 441 of a column of the liquid chromatograph, a flattening treatment, such as polishing, may be performed so that the end face after the welding has a predetermined flatness.

In the present embodiment, the respective tubes are welded at their end portions both in the upstream side and downstream side to fill the space between the first tube 11 and the second tube 12 and the space between the second tube 12 and the third tube 13 (thus, the spaces between the tubes are intercepted from the outside space). This is a preferable embodiment, but the present invention is not limited to this embodiment. It is only required that the space between the first tube 11 and the second tube 12 and the space between the second tube 12 and the third tube 13 are filled, at least in the upstream side. The end portions in the downstream side may be partially welded or may not be welded at all.

The inner diameter of the first tube 11 through which a sample liquid flows is approximately 10 μm. When such a capillary is produced through the elongation method, it is difficult to produce a tube having a thick tube wall. Accordingly, the capillary having a small inner diameter has a small overall diameter. Such a capillary is bent or broken only when a small impact is applied to the capillary. The ESI sprayer tube 10 according to the present embodiment has a triple tube structure including the first tube 11, the second tube 12, and the third tube 13, and thus has the desired rigidity. Although the triple tube structure is adopted in the present embodiment, a multiple tube structure (a double tube structure or a quadruple or more tube structure) including the appropriate number of tubes according to the rigidity level required for the ESI sprayer tube 10 may be adopted.

As shown in FIG. 5, the ESI sprayer tube 10 is connected to the outlet tube 441 of the column 44 by a tube-connecting tool 22. The tube-connecting tool 22 has a cylindrical body with opposite ends each formed in a tapered shape (ferrule shape), and is provided with, along the axial direction of the cylindrical body, a through hole with a diameter corresponding to the outer diameter of the outlet tube 441 of the column 44 and the outer diameter of the third tube 13 of the ESI sprayer tube 10. Although the outer diameter of the outlet tube 441 of the column 44 and the outer diameter of the third tube 13 are the same in the embodiment for facilitating the description, these outer diameters may be different from each other. If these outer diameters are different from each other, a tube-connecting tool 22 provided with a through hole with an inner diameter corresponding to these outer diameters may be used.

For the connection of the outlet tube 441 of the column with the ESI sprayer tube 10 using the tube-connecting tool 22, the outlet tube 441 of the column is inserted from one end of the through hole, and the ESI sprayer tube 100 is inserted from the other end of the through hole, so that both tubes are in contact with each other at their end faces. Then, both ends of the tube-connecting tool 22 are pushed to the respective outlet tube 441 and ESI sprayer tube 10 using coupling and ferrule, so that plastic deformation is performed on both ends of the tube-connecting tool 22.

As previously mentioned, in a conventional ESI sprayer tube, adhesive was applied to only a part of the inner wall of one (a tube located in the outer side, for example) of the two adjacent tubes so as to fix the other one (a tube located in the inner side, for example) of the tubes. When such an ESI sprayer tube was connected to the outlet tube of the column, and a sample liquid and a mobile phase (sample liquid and others) were introduced, the sample liquid and others entered a space between the two tubes from a part where no adhesive was applied. The sample liquid and others that enter the space between the two tubes is hardly exchanged with a sample liquid flowing through the outside of the space, causing the oxygen concentration to gradually decrease. As a result, an oxygen concentration cell is formed, and the tubes corrode (deposit corrosion). Further, corrosion products generated due to the corrosion enter the first tube, which causes clogging. In particular, if a sample liquid and others that contain halide ions including chlorine ions flow into the space, such clogging further develops. This causes the clogging to easily occur in the first tube.

In contrast, in the ESI sprayer tube 10 according to the present embodiment, the first tube 11 and the second tube 12, as well as the second tube 12 and the third tube 13 are fixedly attached to each other by welding (welded portion 14), and thus the spaces defined between the two adjacent tubes are completely sealed. Accordingly, the sample liquid and others that flow out from the column 44 and pass through the outlet tube 441 of the column cannot enter the spaces. Therefore, the deposit corrosion as mentioned earlier does not occur, so that the first tube 11 never becomes clogged.

In the ESI sprayer tube 10 according to the present embodiment, all the first tube 11, second tube 12, and third tube 13 are made of stainless steel, and connected to each other by welding. In other words, the overall ESI sprayer tube 10 is made of stainless steel. Thus, an ESI voltage having a predetermined magnitude is applied to the third tube 13 located in the outermost side, whereby a uniform electric potential is formed over the ESI sprayer tube 10. Thus, the sample liquid that flows through the first tube 11 can be easily electrified. In addition, since it is only required to apply the voltage to the tube located in the outermost side, flexibility is high in determining the location of a voltage application section and designing a voltage application path. Furthermore, since materials other than stainless steel are not used, a background noise due to contamination of a component derived from such materials into a sample liquid does not appear.

Figure 6A:
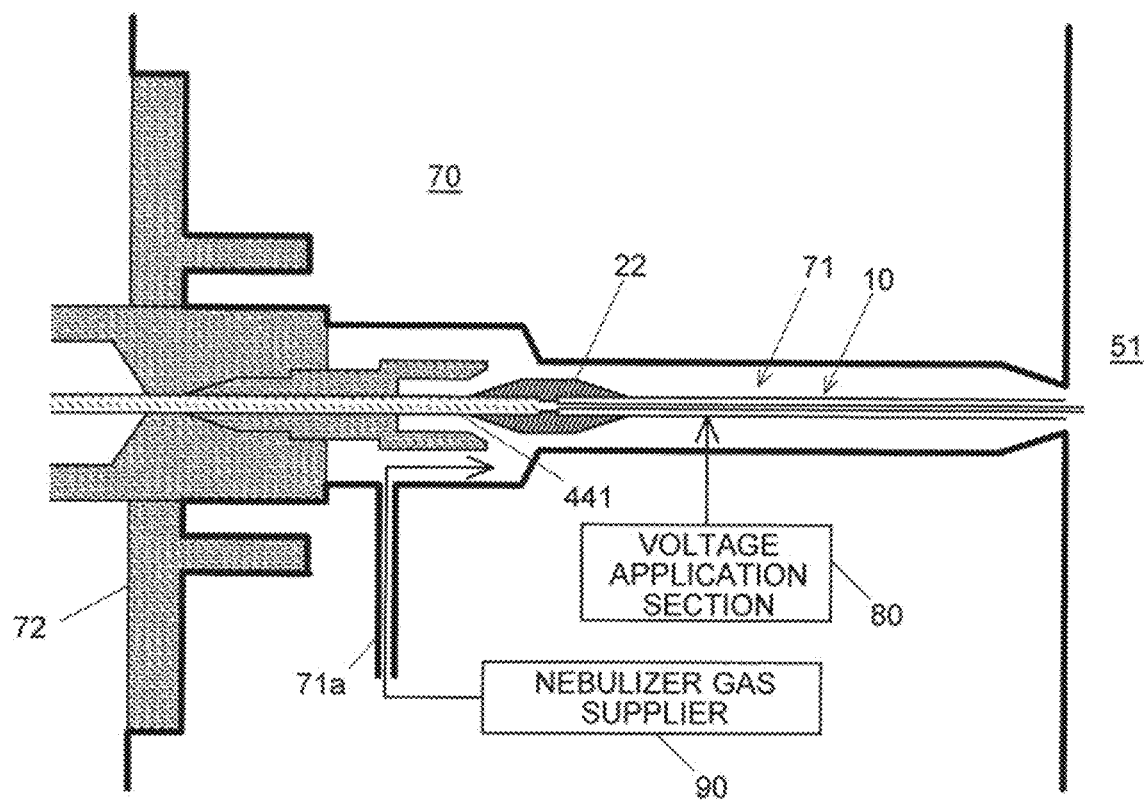
FIGS. 6A and 6B are diagrams each showing a state in which the ESI sprayer tube according to the present embodiment is attached to a housing of a mass spectrometer.
Figure 6B:
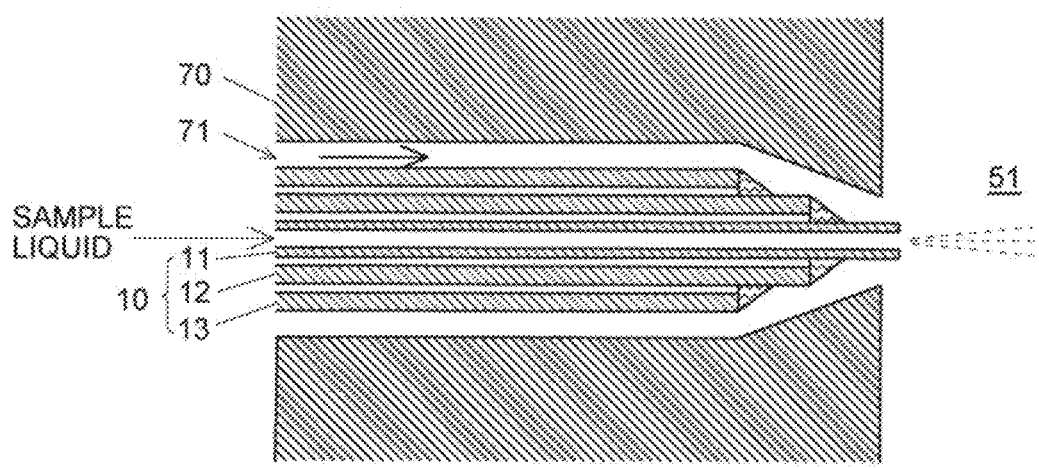

The ESI sprayer tube 10 according to the present embodiment is inserted into a hole 71 provided in the housing 70 of the mass spectrometer 50, and is operated as the ESI sprayer 61. FIG. 6A shows a state where the ESI sprayer tube 10 is inserted into the hole 71 of the housing 70. FIG. 6B is an enlarged diagram showing the vicinity of the ionization chamber 51. It should be noted that the ESI sprayer tube 10 is simplified to the double tube structure in FIG. 6A.

The housing 70 is provided with a hole 71 having a diameter larger than the outer diameter of the ESI sprayer tube 10 (i.e., the outer diameter of the third tube 13). The ESI sprayer tube 10 is connected to the outlet tube 441 of a column 44 by a tube-connecting tool 22, and the tubes in the connected state are attached to a fixation tool 72. The fixation tool 72 is then attached to the housing 70, so that the ESI sprayer tube 10 connected to the outlet tube 441 of the column 44 is inserted into the hole 71.

There is a space between the ESI sprayer tube 10 and the inner wall of the hole 71. In the housing 70, a nebulizer gas passage 71a is formed and has the distal end connected to a nebulizer gas supplier 90. Nebulizer gas, such as nitrogen gas, supplied from the nebulizer gas supplier 90 passes through the nebulizer gas passage 71a and flows in the aforementioned space. Then, the nebulizer gas passes through the outside of the ESI sprayer tube 10 and flows toward the ionization chamber 51. The distal end of the hole 71 has a tapered shape which is the same as that of the distal end of the ESI sprayer tube 10, and the distal end of the first tube 11 slightly protrudes from the hole 71. When the nebulizer gas flowing through the hole 71 reaches the distal end of the hole 71, the flow of the nebulizer gas is deflected so that the nebulizer gas is directed to the sample liquid flowing out from the distal end of the ESI sprayer tube 10. Accordingly, the sample liquid and others are sprayed to the ionization chamber 51. The shape of the distal end of the ESI sprayer tube 10 (tapered shape) is defined so that a sample liquid and others are sprayed in the desired direction from the ESI sprayer tube 10 (i.e., the distribution of the sample liquid and others forms a desired cone shape). The lengths of the first tube 11, second tube 12, and third tube 13 are then determined according to the shape of the distal end of the ESI sprayer tube 10. Although it is a preferable embodiment that each length of the tube is set, this embodiment is not the essential requirement of the present invention. For example, when it is not necessary to define the distribution of the sample liquid and others at high accuracy, the length of each tube may be the same.

The housing 70 is provided with a voltage application section 80 for applying a predetermined ESI voltage to the third tube 13 of the ESI sprayer tube 10. The voltage applied from the voltage application section 80 to the third tube 13 transmits through the welded portion 14 and the second tube 12 so as to be applied to the first tube 11. Thus, the sample liquid that flows in the first tube 11 is electrified.

An experiment to verify the effects obtained by the ESI sprayer tube according to the present invention is described. In this experiment, two ESI sprayer tubes having the double tube structure were used. One of the two tubes had the inlet end portion that was welded as in the embodiment mentioned earlier (present embodiment), and the other one had the inlet end portion that was not welded (comparative embodiment). The inner tube had the inner diameter of 50 μm and the outer diameter of 170 μm (These sizes were common to the example and the comparative embodiment. Both values were design values). The outer tube had the inner diameter of 170 μm, and the outer diameter of 1.6 mm (These sizes were common to the example and the comparative embodiment. Both values were design values). Although the outer diameter of the inner tube and the inner diameter of the outer tube were the same value, there was a slight space between the outer diameter and the inner diameter due to an error during the production of a capillary.

Regarding each of the ESI sprayer tubes of the embodiment and the comparative embodiment, the following experiment was conducted: (1) a mixed liquid including 5 mM of ammonium acetate and 0.1% formic-acid solution, and (2) 40% methanol were sequentially passed through each of the ESI sprayer tubes; and the ESI sprayer tubes were left to stand for two days. Then, the states of these ESI sprayer tubes were checked.

Figure 7A:
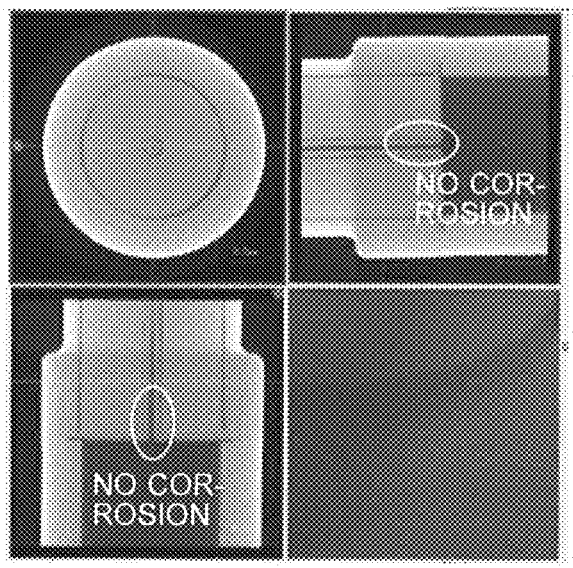
FIGS. 7A and 7B are images showing the results of experiments in which the ESI sprayer tube according to the present embodiment and the conventional ESI sprayer tube are respectively used.
Figure 7B:
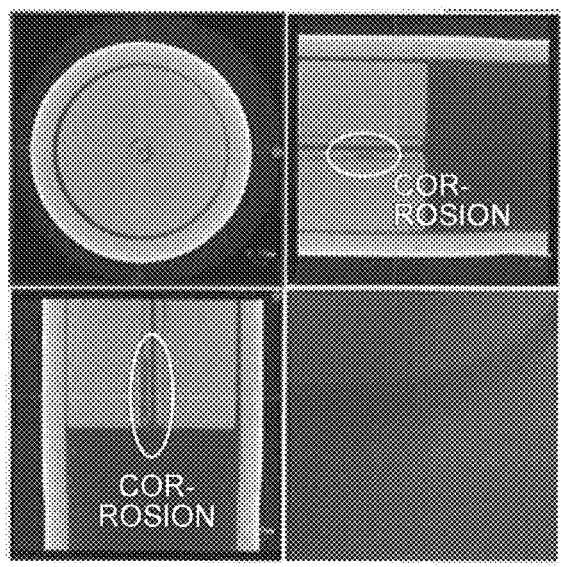

FIG. 7A includes X-ray fluoroscopic images of the ESI sprayer tube according to the present embodiment, and FIG. 7B includes X-ray fluoroscopic images of the ESI sprayer tube according to the comparative embodiment. The upper left image of each of FIGS. 7A and 7B is an X-ray fluoroscopic image of the end face of the ESI sprayer tube. Both upper right and lower left images are X-ray fluoroscopic images of the cross section of the ESI sprayer tube. Corrosion occurs in FIG. 7B that shows the comparative embodiment, whereas no corrosion occurs in FIG. 7A that shows the present embodiment.

The aforementioned embodiment is an example of the present invention, and can be appropriately modified along objectives of the present invention. The description is given to a liquid chromatograph mass spectrometer in the present embodiment. Here, when only a mass spectrometer is used without using a liquid chromatograph, the same configuration can be employed.

Although a plurality of tubes for forming the ESI sprayer tube 10 are fixedly attached to each other by welding in the aforementioned embodiment, the tubes may be fixedly attached to each other by other methods including soldering. Although the welded portion 14 is formed only between the tubes adjacent to each other at the end faces in the upstream side in the aforementioned embodiment, the overall end faces excluding the interior of the first tube 11 may be welded or soldered. The soldering method has the advantage of easy operation. Furthermore, according to the soldering method, the end faces of the tubes are easily flattened when the tube fixation portion is formed. It is preferable that the tube fixation portion is made of a material (gold or silver) more inactive than the stainless steel is (the material for each tube). This can reduce the possibility that a component derived from a material of the tube fixation portion is mixed in a sample liquid and appears as another background noise.

In the aforementioned embodiment, the ESI voltage is applied to the outermost tube (the third tube 13). When the second tube 12, the third tube 13, or the tube fixation portion is made of a non-conductive material, the ESI voltage may be directly applied to the first tube 11. If the first tube 11 is made of the non-conductive material, the tube-connecting tool 22 having the electric conductivity may be used. Inside the tube-connecting tool 22, a space (gap) may be provided between the end faces of the outlet tube 441 and the ESI sprayer tube 10, and the ESI voltage may be applied to the tube-connecting tool 22, to thereby electrify the sample liquid that flows through the space (gap).

REFERENCE SIGNS LIST

10 . . . ESI Sprayer Tube
11 . . . First Tube (Inner Tube)
12 . . . Second Tube (Intermediate Tube)
13 . . . Third Tube (Outer Tube)
14 . . . Welded Portion (Tube Fixation Portion)
22 . . . Tube-Connecting Tool
40 . . . Liquid Chromatograph
41 . . . Mobile Phase
42 . . . Pump
43 . . . Injector
44 . . . Column
441 . . . Outlet Tube
50 . . . Mass Spectrometer
51 . . . Ionization Chamber
52 . . . Intermediate Vacuum Chamber
53 . . . Analysis Chamber
61 . . . ESI Sprayer
62 . . . Heating Capillary
63 . . . Ion Guide
64 . . . Skimmer
65 . . . Quadrupole Mass Filter
66 . . . Ion Detector
70 . . . Housing
71 . . . Hole
71a . . . Nebulizer Gas Passage
72 . . . Fixation Tool
80 . . . Voltage Application Section
90 . . . Nebulizer Gas Supplier

The invention claimed is:

1. An ESI sprayer tube which is connected to an outlet tube of a column provided in a liquid chromatograph in use, the ESI sprayer tube comprising:
   a) a first tube having an inlet end into which a sample liquid enters from the outlet tube;
   b) a second tube having an inner diameter larger than an outer diameter of the first tube, the second tube being located outside the first tube, where a space is provided between an outer periphery of the first tube and an inner periphery of the second tube; and
   c) a tube fixation portion configured to fix the first tube and the second tube, the tube fixation portion being formed to fill the space so that the space is completely closed over the outer periphery of the first tube at a side at the inlet end,
   where an inner diameter of the first tube is smaller than an inner diameter of the outlet tube and such that the tube fixation portion is exposed to the sample liquid from the outlet tube.

2. The ESI sprayer tube according to claim 1, wherein the tube fixation portion is formed by welding.

3. The ESI sprayer tube according to claim 1, wherein the tube fixation portion is formed by soldering.

4. The ESI sprayer tube according to claim 1, wherein the second tube is shorter than the first tube.

5. The ESI sprayer tube according to claim 1 having an end opposite to the inlet end, wherein at least a portion of the first tube and a portion of the second tube at the end are configured to create a tapered outer shape.

6. The ESI sprayer tube according to claim 1, wherein the first tube is made of a conductive material.

7. The ESI sprayer tube according to claim 1, wherein the first tube and the second tube are both made of a conductive material.

8. The ESI sprayer tube according to claim 1, wherein the first tube and the second tube are made of a same material.

9. An ESI sprayer comprising:
   the ESI sprayer tube according to claim 1; and
   a voltage application section configured to apply voltage to the first tube.

10. The ESI sprayer according to claim 9, wherein the voltage application section is configured to apply voltage to the first tube via the second tube.

11. The ESI sprayer tube according to claim 1, wherein the inner diameter of the second tube is larger than the outer diameter of the first tube over the entire length of the second tube in an axial direction.

12. The ESI sprayer tube according to claim 1, further comprising a third tube, the third tube having an inner diameter larger than an outer diameter of the second tube.

13. The ESI sprayer tube according to claim 1, wherein an end of the first and an end of the second tube are positioned at the same position, in an axial direction, at the inlet end.

14. The ESI sprayer tube according to claim 1, wherein the tube fixation portion is further configured to fill a space between the first tube and the second tube at an end opposite to the inlet end.

15. The ESI sprayer tube according to claim 12, wherein the tube fixation portion is further configured to fix the second tube and the third tube, the tube fixation portion being further formed to fill a space between the second tube and the third tube at the inlet end.

16. The ESI sprayer according to claim 9, wherein the second tube has an inner diameter larger than an outer diameter of the first tube over an entire length of the second tube in an axial direction.

* * * * *